United States Patent [19]

Lapearous

[11] Patent Number: 5,423,386
[45] Date of Patent: Jun. 13, 1995

[54] TURF PLUG COLLECTOR

[75] Inventor: Jerry R. Lapearous, Iowa, La.

[73] Assignee: Turf Hopper, Inc., Iowa, La.

[21] Appl. No.: 98,899

[22] Filed: Jul. 29, 1993

[51] Int. Cl.6 ............................................. A01B 45/02
[52] U.S. Cl. ................................. 172/22; 298/17 R; 414/469; 414/719; 414/703
[58] Field of Search ................ 172/21, 22; 171/7, 144; 56/203, 204; 414/486, 467, 469, 719, 703; 298/17 R, 23 D

[56] References Cited

U.S. PATENT DOCUMENTS

| | | | |
|---|---|---|---|
| 684,127 | 10/1901 | Swindall | 298/8 R X |
| 976,811 | 11/1910 | Kloss | 171/144 X |
| 1,130,735 | 3/1915 | Hughes | 298/23 D |
| 1,170,240 | 2/1916 | Gary | 298/17 R |
| 1,459,385 | 6/1923 | Wills et al. | 298/17 R |
| 1,621,075 | 3/1927 | Larkin | 298/17 R |
| 2,088,209 | 7/1937 | Nolte . | |
| 2,618,917 | 11/1952 | Howser . | |
| 2,706,877 | 4/1955 | Caldwell . | |
| 2,881,844 | 4/1959 | Miller . | |
| 3,022,833 | 2/1962 | Reaser . | |
| 3,429,378 | 2/1969 | Mascaro . | |
| 3,739,857 | 6/1973 | Little . | |
| 3,797,578 | 3/1974 | Velasquez | 172/22 |
| 4,148,362 | 4/1979 | Orth | 172/22 |
| 4,422,510 | 12/1983 | de Ridder | 172/21 |
| 4,796,322 | 1/1989 | Steed et al. . | |
| 5,002,453 | 3/1991 | Shigehisa | 414/502 |
| 5,069,293 | 12/1991 | St. Romain | 172/22 |
| 5,178,221 | 1/1993 | Hamawaki et al. | 172/22 |

Primary Examiner—David H. Corbin
Assistant Examiner—Christopher J. Novosad
Attorney, Agent, or Firm—Oliff & Berridge

[57] ABSTRACT

A turf collecting apparatus has a pan for collecting turf plugs discharged from an aerator. The pan is rotatably mounted on a frame so that the pan is freely rotatable within the frame. The connector is located on the frame at a point so that when the aerator is moved to a raised position, the pan is freely rotatable under the force of gravity to dump the turf plugs from the pan. The pan also has a counterweight connected thereto to cause the pan to rotate back to a collecting position after the turf plugs are dumped from the pan.

21 Claims, 1 Drawing Sheet

TURF PLUG COLLECTOR

BACKGROUND OF THE INVENTION

The present invention relates to aerators for aerating ground such as lawns and golf course fairways and greens by removing plugs of turf therefrom. In particular, the present invention relates to an apparatus and method for collecting turf plugs after they are removed from the lawn, fairway or green by the aerator.

U.S. Pat. Nos. 2,881,844, 3,022,833, 4,148,362 and 4,422,510 disclose apparatus for the provision of vertical channels in grass, fields, meadows, etc. (hereinafter aerators or aerating machines).

U.S. Pat. No. 2,088,209 discloses apparatus for cutting and removing plugs of turf including a collector means for collecting the turf plugs. The collector means comprises a bag-like body 54 and an open collecting chamber or receptacle 55 pivotally connected to a collector frame via a fulcrum shaft 57. Pull-springs 64, connected between the frame of the collector means and stationary points on the carriage of the apparatus, operate to yieldably swing the collecting means inwardly. The collector receptacle may be emptied by manually swinging the same rearwardly and upwardly against the tension of the pull-springs 64.

U.S. Pat. No. 3,797,578 discloses a plug catcher for a green aerator which temporarily catches the small plugs of turf as they are extracted by a turf-aerating machine. The catcher is relatively easy to attach and remove from the gleaning edge, that is, the front or leading edge. Once attached, the catcher is located only a small fraction of an inch from the ground, this distance being regulated effectively by locating this edge closely adjacent to the ground contact points of the rear supporting wheels of the aerator. The catcher is essentially a platform and is illustrated as having a wall making it box-like. The catcher is substantially balanced upon ground-contacting casters with the front end releasably latched onto the axle of the aerator and extending below the axle, immediately to the rear of the aerator's plug extractors, so that the gleaning edge brushes the grass of the fairway turf and is positively held in this turfengaging position to sweep the extracted plugs into the box-like enclosure of the catcher. Two axle-engaging latch hooks, one at each side, are provided for attaching and handling the catcher, which when loaded with extracted turf plugs is lifted from the aerator machine and ordinarily emptied into a truck or cart. However, handling the aerator and catcher requires at least two people.

U.S. Pat. No. 5,069,293 discloses a turf plug catcher comprising a pan 16 having side walls 20, 22 rotatably connected to rigid pan support members 40 by pins 42 and 44. Hydraulic or pneumatic cylinders 48 are connected to the side walls 20, 22 and are used to dump the pan and return it to a collecting position. To dump the pan 16, an operator first lifts the aerator and then actuates the hydraulic or pneumatic cylinders 48 moving the pan 16 to and from the dumping position. The hydraulic system requires additional hydraulic connections to a tractor or the like, and is mechanically complex and expensive to manufacture and maintain.

U.S. Pat. No. 4,796,322 discloses a lawn sweeper with a hamper 16 for collecting debris swept up from a lawn. The hamper is supported on support plates 70 and pins 72 that are located rearwardly of the center of gravity of the hamper support so that when the hamper is loaded with debris, the hamper remains at its forward or normal loading position. The hamper may be dumped by manually elevating or raising the hamper to a rear dumping position using lifting handle 84, or by pulling on handle 92 which pulls cable 90 to rotate the hamper to the dumping position.

SUMMARY OF THE INVENTION

It is an object of the present invention to provide an apparatus and method for collecting turf plugs removed from the ground by an aerator.

It is another object of the invention to provide an apparatus for collecting turf plugs wherein the apparatus can reliably be dumped with a simple mechanical system and without the need for hydraulic or pneumatic cylinders.

It is also an object of the invention to provide a turf plug collector for use with an aerator wherein the collector is freely rotatable within a frame by the force of gravity to dump the turf plugs when the aerator is in a raised position.

To achieve the above and other objects, the apparatus of the present invention comprises a turf plug collector pan for plugs of turf discharged from a turf aerator. A rigid frame for supporting the pan is connectable to an aerator so as to position the pan sufficiently close to the aerator to collect the turf plugs discharged therefrom. At least one connector is provided to rotatably connect the pan to the frame so that the pan is freely rotatable. The connector is located such that when the aerator is lifted to a raised position by a lifting device, the pan is freely rotatable at the connector by the force of gravity to dump the turf plugs, thereby eliminating the need for hydraulic or pneumatic actuators. The force of gravity that causes the pan to rotate at the connector includes the weight of the pan and the turf plugs contained therein.

The pan is preferably balanced on the connector such that it returns to a turf plug collecting position as soon as the turf plugs have been dumped from the pan. In preferred embodiments, such balance is ensured by the presence of at least one counterweight. The counterweight is preferably adjustable to allow for a wide variety of applications of the present invention, and to allow for substantial manufacturing tolerances, thus substantially reducing manufacturing cost.

The apparatus of the invention is inexpensive to manufacture and simple to operate and maintain. It has the further advantage of providing quick and easy collection of turf plugs as they are being discharged from a turf aerator. With the apparatus of the invention, a golf course putting green or other lawn can be maintained in a clean, smooth condition as it is being aerated.

Another advantage of the invention is that the apparatus may be quickly and easily attached to existing aerators without extensive and expensive modification of the machine to which the invention is attached.

The apparatus of the invention also has the advantage of being low in weight.

BRIEF DESCRIPTION OF THE DRAWINGS

The invention will be more easily understood by reference to the drawings, in which.

DESCRIPTION OF PREFERRED EMBODIMENTS

Figure 1:
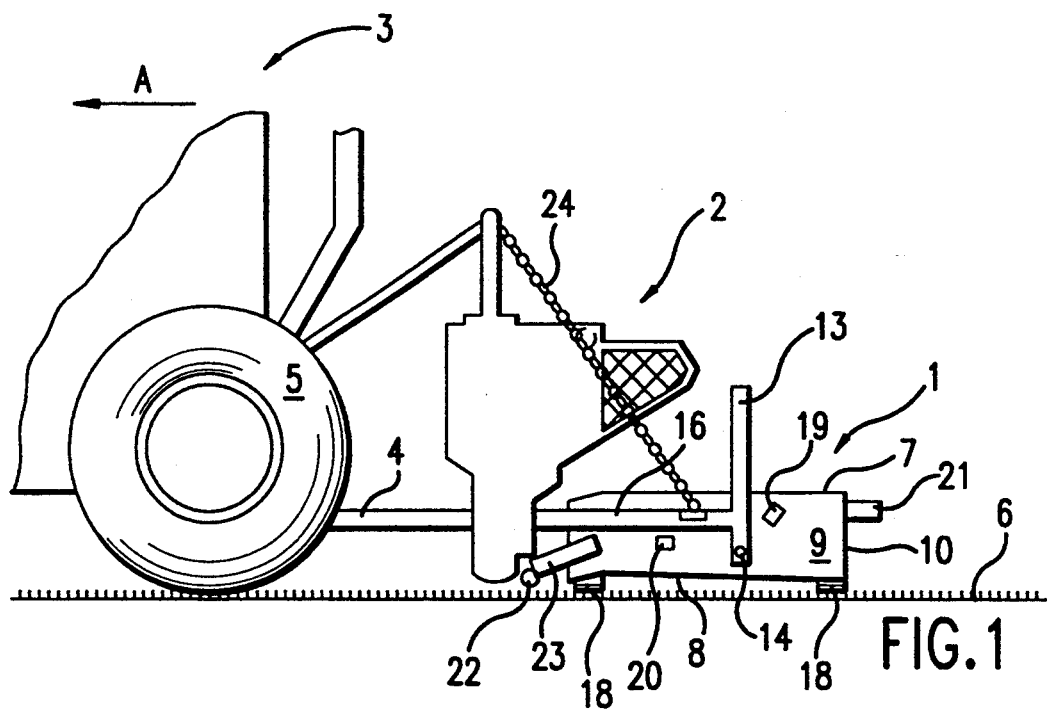
FIG. 1 is an elevational view of an apparatus of the invention connected to an aerating machine with the aerating machine in the operating or lowered position.

In the Figures, the turf plug collecting apparatus of the present invention is generally indicated by the numeral 1 and a conventional aerator is generally indicated by the numeral 2. Aerator 2 is connected to a tractor or other vehicle 3 by support members 4. Tractor 3 has drive wheels 5 and travels in the direction indicated by the arrow A shown in FIG. 1 when a golf course putting green 6 or other turf is being aerated. As is conventional, tractor 3 has a lifting mechanism (not shown) that lifts the aerator up and away from the turf to a raised, non-aerating position shown in FIG. 2. When an operator desires to commence aerating the turf, the operator lowers the aerator to the aerating position shown in FIG. 1. The turf plug collecting apparatus of the present invention may be used with conventional aerators and tractors.

Turf plug collecting apparatus 1 includes a pan 7. Pan 7 preferably has a flat, rectangular bottom 8. The size of the pan can be selected according to the desired volume of the pan. High volume pans work well with large collecting requirements and streamlined volume pans work well with lesser requirements.

Extending substantially perpendicularly upward from pan bottom 8 are two parallel side walls 9 and rear wall 10. The height of the walls can be selected to accommodate a desired volume of turf plugs.

In a preferred embodiment, lip 11 of the front edge of pan 7 is angled downwardly toward the ground to push in front of the pan any turf plugs, dirt, grass, or other debris that may be lying on the ground over which the pan is traveling. Pan 7 preferably has attached wings, which may be made of a flexible material such as rubber, at each side. The wings are preferably held in position by rigid arms made of aluminum or other metal. The arms form an angle of about 45° with the plane in which each corresponding side 9 lies. The wings prevent dirt, grass, or other debris being pushed by lip 11 from sliding off the sides of lip 11.

The side walls 9 of pan 7 are freely rotatably connected to a rigid frame 12 comprised of rigid pan support members 13 by balance-point pins 14. Rigid pan support members 13 are preferably identical in shape and composition and are preferably structural channel aluminum bars. Frame 12 further comprises a horizontal member 15 that rigidly connects support members 13 to one another, and members 16 rigidly connected to pan support members 13 to attach frame 12 to the aerator. Members 16 are located and shaped to ensure proper alignment with connecting members on an aerator or tractor. Balance point pins 14 act as a pivot point for pan 7 and allow pan 7 to freely rotate within frame 12. Preferably, pins 14 are rigidly attached to the pan support members 13 or pan 7 through holes 17, such as by welding the pins 14 to the pan 7 or pan support members 13. Bushings may be provided in side walls 9 and/or on support members 13 to facilitate free rotation of pan 7. In a less preferred embodiment, pins 14 could be substituted by a single rod which extends between support members 13 through walls 9 of pan 7.

Because pan 7 is freely rotatable, wear plates 18 are preferably provided on the bottom of the pan at lip 11 and preferably also at the rear of the pan so that pan 7 is free floating on the ground and rides on the wear plates. The wear plates are preferably disposed on a bottom surface of pan 7 adjacent forward and rear edges of the pan. The wear plates are replaceable, being attached to the pan by bolts or the like. They avoid wear on the pan 7 and lip 11, and thus expand the range of materials from which the pan can be made. For example, the pan can be made of lightweight metal such as aluminum or even of heavy duty plastics to reduce the overall weight of a unit.

The exact location of balance point pins 14 is determined based on the distribution of mass of the pan. Pins 14 are located on the pan support members 13 and walls 9 of pan 7 such that when the lifting device raises aerator 2 to the raised position shown in FIG. 2, the pan is rotatable in the direction of arrow F by the force of gravity. That is, the weight of pan 7 is balanced at pins 14, the weight of turf plugs collected and contained in pan 7 is located in front of the pivot point of the pan (balance point pins 14), causing the pan to rotate and dump the turf plugs from pan 7.

Pan 7 may also include first pan stops 19, which may be made of, or coated or laminated with, a shock absorbing material such as rubber. Pan stops 19, located on either or both sides of pan 7, prevent pan 7 from tipping too far forward and damaging the ground. Second pan stops 20 may also be made of, or coated or laminated with, a shock absorbing material. Pan stops 20 may also, or alternatively, be provided to prevent pan 7 from rotating too far in the direction of arrow R on returning to a collecting position. Thus, pan 7 is freely rotatable on balance point pins 14 between stops 19 and 20 in a preferred embodiment.

Pan 7 preferably includes at least one counterweight 21 located on the rear of pan 7 to provide sufficient weight on the rear of pan 7 to bring the pan back into the collecting position. When pan 7 rotates to a dumping position under the force of gravity of the pan and turf plugs, turf plugs are dumped from pan 7. Counterweight 21 then provides more weight and corresponding gravitational pull on the rear of pan 7, thereby causing pan 7 to rotate in the direction of arrow R. Thus, counterweight 21 causes pan 7 to return to the collecting position. An elastic connector such as a spring may also be connected between one or both of members 16 and one or both walls of pan 7 forward of the pivot pins 14 to assist the action of the counterweight.

Counterweight 21 may be made of solid iron or other material. Preferably, counterweight 21 is adjustable and includes a rod or support capable of having weights added or removed. Adjustable counterweight 21 may also comprise a reservoir such as a PVC plastic tube or rectangular aluminum tube for containing ballast such as water, sand, shot or the like and having one or more openings such as valves for adding and removing a certain weight of ballast. By providing an adjustable counterweight, it is possible to adjust for manufacturing variations and changes in the weight distribution of pan 7 and any attachments that affect the weight of pan 7 relative to balance point pins 14. The reservoir-type counterweight is particularly desirable in that the collector may be manufactured and shipped as a relatively lightweight unit, with weights added by the retailer or user after delivery.

In another embodiment, counterweight 21 may be attached to the back of pan 7 by an adjustable mechanism, by which the lever arm of the counterweight may be extended. The adjustable mechanism may comprise, for example, a slotted extension on one of the pan and the counterweight, and an extension holding a pin that is slidable in the slot on the other. A gripping element such as a clamp or a bolt may be used to hold the counterweight in position after adjustment. A screw mechanism with lock bolts may alternatively be used to adjust the position of the counterweight.

If pan 7 tips over too easily or frequently, horizontal member 15 can be formed such that weight can be adjustably added thereto. Horizontal member 15 preferably comprises aluminum rectangular tubing comprising a reservoir containing a ballast such as water, sand, shot or the like having one or more openings 24 for adding or removing ballast. Adjustably adding weight to horizontal member 15 adds more force on pin 14 to prevent pan 7 from tipping over and forces pan 7 down against the ground to ensure consistent ground contact.

Pan 7 may be provided with a releasable pan dump preventer, for example based on a movable pin between member 16 and side 9, that allows an operator to raise the aerator 2 without dumping turf plugs from pan 7. This allows an operator to raise the aerator and travel to a remote location before dumping pan 7. When the operator has reached the desired dumping location and with the aerator still in the raised position, the operator releases the pan dump preventer and the force of gravity on the pan and turf plugs contained therein cause pan 7 to freely rotate and dump its contents, whereupon the pan rotates back to its collecting position.

Wheels 22 are optional and may be provided to compensate for variations in terrain and prevent lip 11 and the rigid support arms for supporting the flexible wings from damaging the turf. Although pan stops 19 and 20 prevent pan 7 from rotating too far, variations in the terrain may cause the lip 11 of pan 7 or the support arms supporting wings to contact the turf. Wheels 22 may be provided on an extension arm 23 from the forward end of one or both sides of pan 7. A lower surface of wheels 22 is preferably located above a plane defined by lower surfaces of wear plate 18, and wherein wheels 22 preferably ride just above the turf while the collecting apparatus is in normal operation. They may prevent damage to the turf by absorbing the force of lip 11 and rigid support arms rotating into the turf and widely distributing the force therefrom. Wheels 22 also cause lip 11 and the rigid support arms to rise up over local elevations in the terrain to prevent lip and rigid support arms from contacting the terrain.

Members 16 are connected by bolts, pins or the like to aerating machine 2. Additional support such as chain 25 may be provided to fix the frame to the aerator and/or the tractor lifting mechanism. The frame is located so that the wear plates 18 rest on the ground when the apparatus 1 is in the collecting position.

Although preferred embodiments of the present invention have been described in detail above, it should be understood that the invention is not limited thereby.

What is claimed is:

1. An apparatus for collecting turf plugs emitted from an aerator that is movable between a raised position and a lowered position, said apparatus comprising:
   a frame connectable to said aerator;
   a pan supported by said frame for collecting turf plugs, said pan pivotably attached to said frame and adapted to be freely rotatable within said frame by the force of gravity to dump the turf plugs and to return to a turf plug collecting position when the aerator is in the raised position; and
   at least one pan stop that prevents said pan from rotating beyond a dumping position.

2. The apparatus of claim 1, wherein said pan is supported on said frame by a pair of pins connected between said frame and said pan.

3. The apparatus of claim 2, wherein said pins are connected between said frame and side walls of said pan.

4. The apparatus of claim 2, wherein said frame comprises at least two pan support members connected together by at least one cross member, and said pins are connected between said pan support members and said pan.

5. The apparatus of claim 1, further comprising at least one counterweight for causing said pan to return to said collecting position after the turf plugs are dumped from said pan.

6. The apparatus of claim 5, wherein the weight of said counterweight is adjustable.

7. The apparatus of claim 6, wherein said weight is adjusted such that said pan is adapted to maintain consistent ground contact.

8. The apparatus of claim 6, wherein the position of said counterweight is adjustable.

9. The apparatus of claim 1, wherein said at least one pan stop is a rear pan stop.

10. An apparatus for collecting turf plugs emitted from an aerator that is movable between a raised, non-collecting position and a lowered, collecting position, said apparatus comprising:
    a collector for collecting turf plugs;
    a frame connectable to said aerator;
    at least one connector for rotatably connecting said collector to said frame, said connector being located on said frame such that the collector is adapted to be freely rotatable within said frame by the force of gravity to dump the turf plugs and to automatically return to a turf plug collecting position when said aerator is in the raised position; and
    at least one collector stop that prevents said collector from rotating beyond a dumping position.

11. A method of collecting and dumping turf plugs emitted from an aerator, comprising the steps of:
    collecting turf plugs emitted from the aerator in a collector rotatably mounted within a frame connected to the aerator, said collector being in a collecting position and freely rotatable within said frame;
    raising said aerator and allowing the collector to freely rotate within said frame by the force of gravity to dump the turf plugs; and
    returning said collector to said collecting position by the force of gravity.

12. The method of claim 11, further comprising the step of:
    adjusting a counterweight on said collector to ensure that the collector returns to said collecting position after the collector has dumped the turf plugs.

13. The method of claim 11, further comprising the step of:
    adjusting a weight of said frame to ensure consistent ground contact by said pan.

14. An apparatus for collecting turf plugs emitted from an aerator that is movable between a raised position and a lowered position, said apparatus comprising:
a frame connectable to said aerator; and
a pan supported by said frame for collecting turf plugs, said pan pivotably attached to said frame and adapted to be freely rotatable within said frame by the force of gravity to dump the turf plugs and to return to a turf plug collecting position when the aerator is in the raised position, wherein said pan is supported on said frame by a pair of pins connected between said frame and said pan, said pins being connected between said frame and side walls of said pan, said frame comprising at least two pan support members connected together by at least one cross member, said pins being connected between said pan support members and said pan, wherein the at least one cross member comprises a reservoir for ballast.

15. An apparatus for collecting turf plugs emitted from an aerator that is movable between a raised position and a lowered position, said apparatus comprising:
a frame connectable to said aerator;
a pan supported by said frame for collecting turf plugs, said pan pivotably attached to said frame and adapted to be freely rotatable within said frame by the force of gravity to dump the turf plugs and to return to a turf plug collecting position when the aerator is in the raised position; and
at least one wear plate on a bottom surface of said pan.

16. An apparatus for collecting turf plugs emitted from an aerator that is movable between a raised position and a lowered position, said apparatus comprising:
a frame connectable to said aerator;
a pan supported by said frame for collecting turf plugs, said pan pivotably attached to said frame and adapted to be freely rotatable within said frame by the force of gravity to dump the turf plugs and to return to a turf plug collecting position when the aerator is in the raised position; and
at least one front pan stop, said front pan stop preventing said pan from rotating beyond a collecting position.

17. An apparatus for collecting turf plugs emitted from an aerator that is movable between a raised position and a lowered position, said apparatus comprising:
frame connectable to said aerator; and
a pan supported by said frame for collecting turf plugs, said pan pivotably attached to said frame and adapted to be freely rotatable within said frame by the force of gravity to dump the turf plugs and to return to a turf plug collecting position when the aerator is in the raised position, wherein the pan comprises a lip extending at an angle downwardly at a forward edge of said pan.

18. An apparatus for collecting turf plugs emitted from an aerator that is movable between a raised position and a lowered position, said apparatus comprising:
a frame connectable to said aerator;
a pan supported by said frame for collecting turf plugs, said pan pivotably attached to said frame and adapted to be freely rotatable within said frame by the force of gravity to dump the turf plugs and to return to a turf plug collecting position when the aerator is in the raised position; and
at least one wheel connected to said pan by an extension member that extends forwardly from said pan.

19. The apparatus of claim 18, further comprising wear plates on a bottom surface of said pan adjacent forward and rear edges of said pan, and wherein a lower surface of said at least one wheel is located above a plane defined by lower surfaces of said wear plates.

20. The apparatus of claim 19, wherein said wear plates are located adjacent opposite sides of said pan, and wherein said at least one wheel comprises at least two wheels, at least one said wheel extending forwardly from each side of said pan.

21. An apparatus for collecting turf plugs emitted from an aerator that is movable between a raised position and a lowered position, said apparatus comprising:
a frame connectable to said aerator;
a pan supported by said frame for collecting turf plugs, said pan pivotably attached to said frame and adapted to be freely rotatable within said frame by the force of gravity to dump the turf plugs and to return to a turf plug collecting position when the aerator is in the raised position; and
at least one counterweight for causing said pan to return to said collecting position after the turf plugs are dumped from said pan, wherein said at least one counterweight comprises a reservoir for ballast.

* * * * *

UNITED STATES PATENT AND TRADEMARK OFFICE
CERTIFICATE OF CORRECTION

PATENT NO. : 5,423,386
DATED : June 13, 1995
INVENTOR(S) : Jerry R. LAPEAROUS

It is certified that error appears in the above-indentified patent and that said Letters Patent is hereby corrected as shown below:

ON THE COVER PAGE OF PATENT:

In the Figure, change "24" to --25--.

Figure 2:
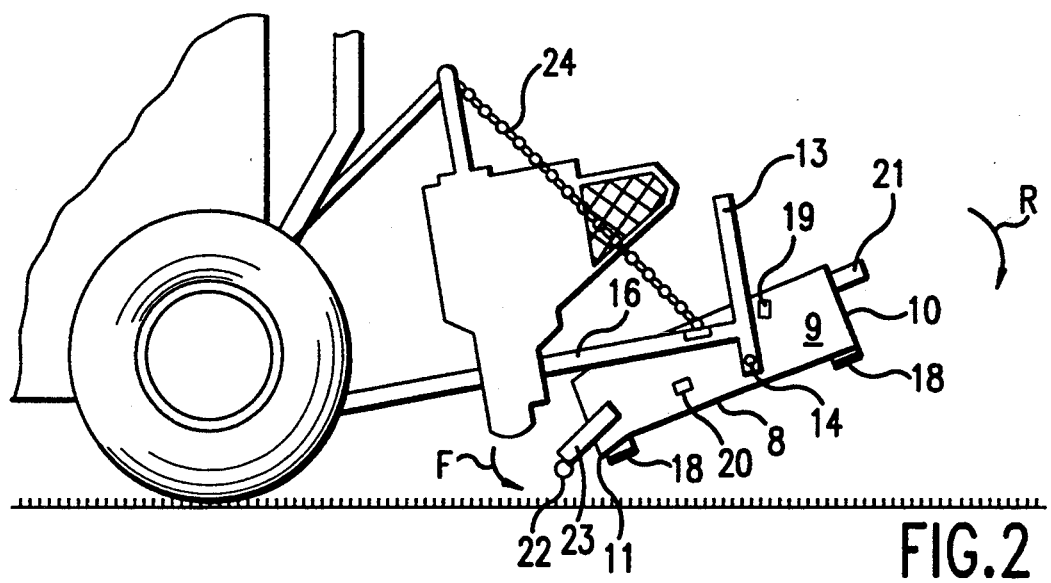
FIG. 2 is an elevational view of an apparatus of the invention connected to an aerating machine with the aerating machine in the non-operating or raised position.
Figure 3:
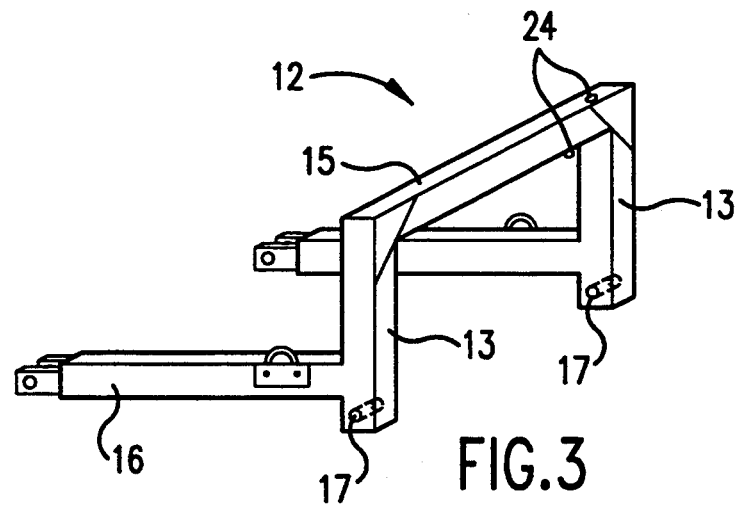
FIG. 3 is a perspective view of a frame of an apparatus of the invention.

IN FIGURES 1 and 2:

In Figures 1 and 2, change "24" to --25--.

Signed and Sealed this

Sixteenth Day of April, 1996

Attest:

BRUCE LEHMAN

Attesting Officer

Commissioner of Patents and Trademarks